(12) United States Patent
Theophil et al.

(10) Patent No.: US 7,757,179 B2
(45) Date of Patent: Jul. 13, 2010

(54) DISPLAY METHOD, COMPUTER PROGRAM PRODUCT AND COMPUTER SYSTEM

(75) Inventors: Sebastian Theophil, Berlin (DE); Arno Schoedl, Berlin (DE); Markus Hannebauer, Berlin (DE)

(73) Assignee: Think-Cell Software GmbH, Berlin (DE)

( * ) Notice: Subject to any disclaimer, the term of this patent is extended or adjusted under 35 U.S.C. 154(b) by 435 days.

(21) Appl. No.: 11/531,866

(22) Filed: Sep. 14, 2006

(65) Prior Publication Data

US 2008/0072165 A1 Mar. 20, 2008

(51) Int. Cl.
*G06F 3/048* (2006.01)

(52) U.S. Cl. .................. 715/764; 715/215; 715/231; 715/232

(58) Field of Classification Search ............. 715/215, 715/230–232, 764
See application file for complete search history.

(56) References Cited

U.S. PATENT DOCUMENTS 5,622,178 A * 4/1997 Gilham ............. 600/523
7,131,060 B1 * 10/2006 Azuma ............. 715/260
2005/0179684 A1 * 8/2005 Wallace ............. 345/419
2007/0109301 A1 * 5/2007 Smith ............. 345/440
2007/0271500 A1 11/2007 Theophil et al.

OTHER PUBLICATIONS

Diploma Thesis "Automatic Chart Labeling", Sebastian Müller, Berlin, Oct. 18, 2005, Exhibit A.
Simon Lok and Steven Feiner, A Survey of Automated Layout Techniques for Information Presentations, Smart Graphics '01 Hawthorne, NY USA pp. 1-8.
Notice of Allowance mailed Jan. 8, 2010, for U.S. Appl. No. 11/437,422.

* cited by examiner

*Primary Examiner*—Weilun Lo
*Assistant Examiner*—Enrique W Iturralde
(74) *Attorney, Agent, or Firm*—Martin Fleit; Paul D. Bianco; Fleit Gibbons Gutman Bongini & Bianco, PL

(57) ABSTRACT

A display method wherein a labeled scatter chart is displayed on a graphical user interface, the scatter chart having a plurality of labels. A first modification of one of the labels is entered via a graphical user interface by a user. Execution of labeling instructions that implement a labeling algorithm for generating a first modified labeled scatter chart in response to the entry of the first modification is started. The first modified labeled scatter chart is displayed.

16 Claims, 9 Drawing Sheets

DISPLAY METHOD, COMPUTER PROGRAM PRODUCT AND COMPUTER SYSTEM

BACKGROUND OF THE INVENTION

1. Field of the Invention

The present invention relates to the field of data processing, and more particularly to scatter chart labeling.

2. Prior Art

A chart, also referred to as a graph, is a useful visual tool for communicating numeric and/or other information is a concise and intuitive format. A particular type of chart is a scatter chart. Typically, a scatter chart has two value axes, showing one set of numerical data along the x-axis and another along the y-axis. It combines these values into single data points. Scatter charts are also referred to as XY charts. The data points often carry labels to show the value of the numeric information that is represented by a respective data point.

For creation of a scatter chart using Microsoft PowerPoint the numeric information to be visualized in the scatter chart needs first to be entered into a so-called data sheet. The data sheet is a grid that resembles a spreadsheet for entry of the numeric information. Alternatively it is also possible to enter the numeric information into a Microsoft Excel spreadsheet.

After entry of the numeric information into the data sheet or spreadsheet is completed, the data sheet or spreadsheet is closed and the respective scatter chart is generated and displayed.

SUMMARY OF THE INVENTION

In accordance with the present invention there is provided a display method comprising displaying a labeled scatter chart on a graphical user interface, the scatter chart having a plurality of labels, entering a modification of one or the labels via the graphical user interface by a user, starting execution of labeling instructions that implement a labeling algorithm for generating a modified labeled scatter chart in response to the entry of the first modification, displaying the modified labeled scatter chart.

Embodiments of the invention are particularly advantageous as they facilitate to display the numeric information being assigned to one of the data points of the scatter chart within a textual label assigned to that data point without a need to view a data sheet or spreadsheet in addition. Further, this facilitates to directly edit the labels of the labeled scatter chart without having to go through the intermediary of a data sheet or spreadsheet.

Furthermore, the present invention is particularly advantageous as the labeling algorithm is started in response to the entry of a modification of one of the labels. This enables to provide immediate feedback to a user as to the effect of the modification on the labeled scatter chart.

In accordance with an embodiment of the invention each of the labels is contained in a separate graphical object, such as a text field. As a result of the execution of the labeling algorithm all graphical objects are placed within the scatter chart with or without a connecting line. For editing a label a user can open the graphical object that contains the label, such as by clicking on the graphical object with a computer mouse. After the graphical object has been opened the user can enter a modification of the label by means of a keyboard that is coupled to the computer. With each keystroke by which a character is added, replaced or deleted the labeling algorithm is restarted in order to adapt the layout of the labeled scatter chart accordingly. After the modification of the label has been completed, the graphical object is closed. Subsequently the user can open another one of the graphical objects for editing another label.

In accordance with an embodiment of the invention execution of the labeling algorithm is terminated when a subsequent modification is entered while processing of the labeling algorithm due to a previous modification is still ongoing. In response to the subsequent modification the labeling algorithm is reset and restarted. For example, execution of the labeling instruction that implement the labeling algorithm is restarted with each keystroke by which a user enters an additional character into a label, deletes a character or replaces a character by another character. Hence, an updated labeled scatter chart that has been generated by execution of the labeling instruction is only displayed if the processing of the labeling algorithm has been completed before a new modification is entered.

In accordance with an embodiment of the invention execution of the labeling algorithm is performed in parallel. This has the advantage that the computer always remains responsive to further user interactions and as a consequence the user can continue to work with the presentation program. If the computer system that is used to run the labeling instructions has sufficient proceeding capacity the required processing time for complete execution of the labeling instructions can be below the frequency with which a typical user can perform subsequent keystrokes. As a consequence the graphical user interface gives the user the impression that immediately after each keystroke an updated labeled scatter chart is displayed that reflects the effect of that keystroke on the labeling of the scatter chart.

In accordance with an embodiment of the invention the scatter chart comprises a plurality of data points. A set of rays is defined for each of the data points. Each ray of the set of rays that is defined for a given one of the data points originates from that data point. The labeling of the data points is performed by iteratively placing the labels on one of the rays of the set or rays of the data point to which a given label is assigned. This is performed by execution of the labeling instruction that implement the respective labeling algorithm.

In accordance with an embodiment of the invention each pair of neighboring rays of a given set of rays encloses an angel of $2\pi/N$, where N is the number of rays per set of rays. The number N of rays per data point is chosen in view of the available computational resources and/or the latency time for performing the labeling algorithm that is acceptable for a user. If a larger value is selected for N, the quality of labeling improves. Hence, there is a trade-off between the latency time for performing the labeling algorithm that is in proportion to N and the resultant quality of the labeling. A preferred choice for N that results both in a high quality labeling and a relatively short latency time is $N=128$.

In accordance with an embodiment of the invention the labeling is performed by tentatively placing one of the labels on one of the rays of the set of rays of the data point to which that label is assigned. A measure is then calculated for each other data point that has not yet been labeled. This provides a list of measures. The list of measures is used to select or deselect the tentative placement of the one of the labels. If the tentative placement is selected, the data point to which the label is assigned becomes a labeled data point.

In accordance with an embodiment of the invention the calculated measure for each data point is indicative of the remaining space for labeling this data point. The measure can be calculated using a monotonically decreasing function of the distance of a tentative label position from the corresponding data point on one of the rays originating from that data point. The function is monotonically decreasing as closer label positions are preferred over label positions far away from the data point. For example, the function is an exponential function. The function is integrated over all intervals of the ray corresponding to allowable label positions, i.e., label positions which cause no collisions with already placed labels. These intervals are calculated for all rays of the set of rays belonging to the same data point and the integrals are summed up which provides the measure.

In accordance with an embodiment of the invention the following steps are performed by execution of the labeling instructions: for each data point that has not been labeled: selecting at least one ray of that data point that allows a placement of the label that is assigned to that data point in proximity to the data point; for each data point that has not been labeled: tentatively placing the label that is assigned to that data point on the at least one selected ray of the data point to which the label is assigned, calculating the measure for each other data point that has not been labeled, providing a list of measures for that tentative placement of the one of the labels, and sorting each list of measures in ascending order; selecting on of the lists of measures that has a maximum first list entry, labeling the data point of the selected list of measures.

If there is more than one list that has the same maximum first list entry, the second list entries of those lists that have the same maximum first list entry are considered in order to identify one of the lists that has a maximum second list entry. If one of these lists does in fact have a maximum second list entry this list is selected. If there is more than one list that has the same maximum second list entry, the third list entries are considered, etc.

In another aspect the present invention relates to a computer program product for scatter chart labeling.

In accordance with an embodiment of the invention the computer program product is implemented as a so called plug-in. The plug-in is interoperable with a presentation program, such as Microsoft PowerPoint or the like.

BRIEF DESCRIPTION OF THE DRAWINGS

In the following, embodiments of the invention are explained in greater detail by way of example only making reference to the drawings in which.

DETAILED DESCRIPTION OF PREFERRED EMBODIMENTS OF THE INVENTION

Figure 1:
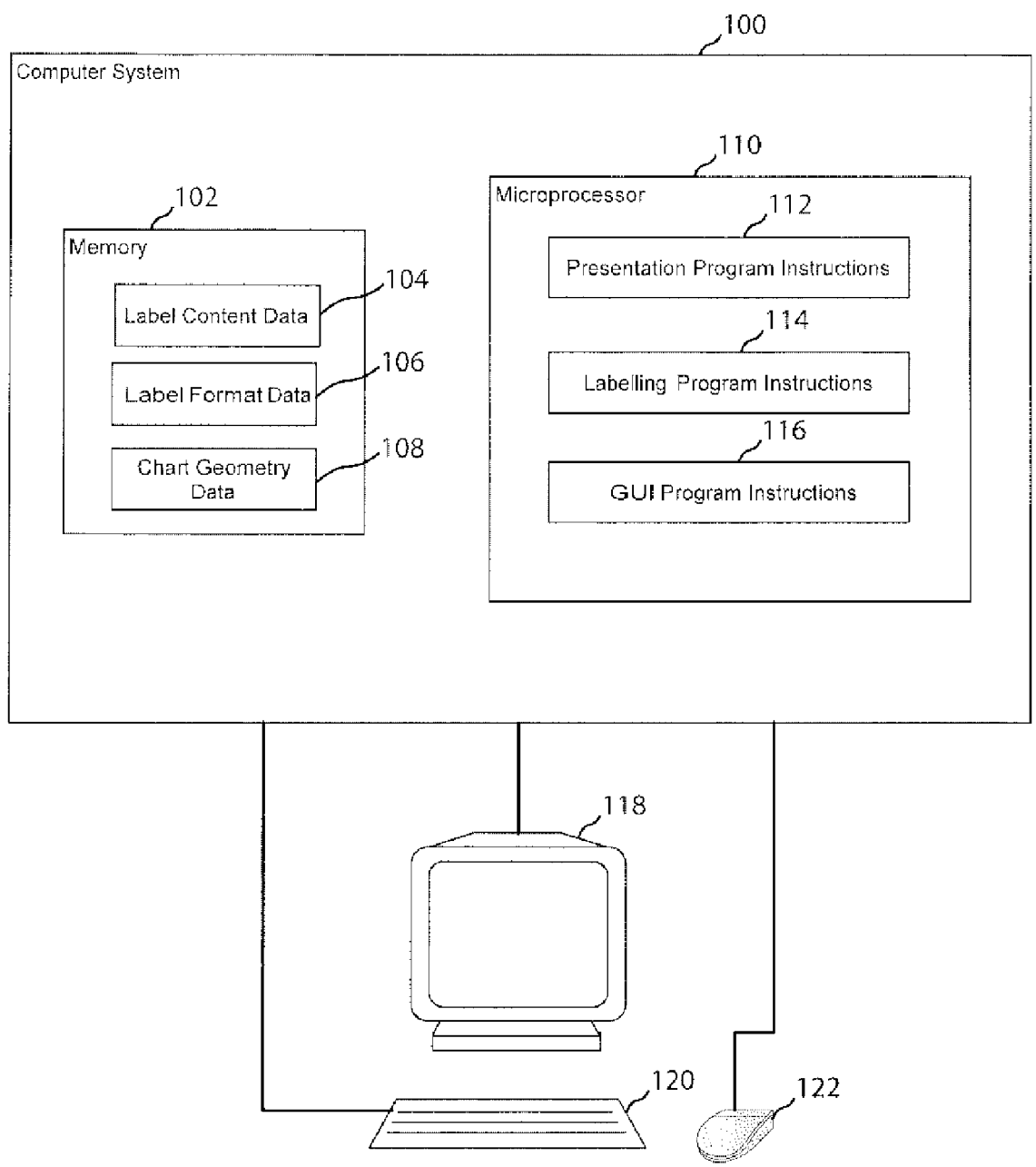
FIG. 1 is a block diagram of a first embodiment of a computer system.

FIG. 1 shows a block diagram of a computer system 100 that has a memory 102 for storing data that specifies a scatter chart, such as label content data 104, label format data 106 and chart geometry data 108. The label content data 104 has a data item for each label. For example, each data item is a pair of numerical values that specify the coordinates of a respective data point in the scatter chart.

The label format data 106 contains the specification of the formatting of the data items contained in the label content data 104, such as character size, font type, bold type, italics, etc. The size of a given label is thus determined by the data item it carries and the format with which the data item is to be displayed within the label.

The chart geometry data 108 contains a specification of the overall layout of the scatter chart, such as the width and height of the scatter chart, the graphical symbols used for the data points, the line width, line style, colors, etc. of the connecting lines, if connecting lines are required, etc.

The memory 102 can be the working memory of the computer system 100 or a non-volatile memory, such as a storage disk.

The computer system 100 has at least one microprocessor 110 for execution of presentation program instructions 112, labeling program instructions 114 and graphical user interface (GUI) program instructions 116.

The presentation program instructions 112 constitute a presentation program, such as Microsoft PowerPoint or a similar program. The labeling program instructions 114 implement a labeling algorithm for labeling a scatter chart in accordance with the label content data 104 and the label format data 106. Preferably the labeling program instructions 114 perform the labeling of the scatter chart fully automatically within the limits set by predefined layout constraints.

In the embodiment considered here the labeling program instructions 114 constitute a so-called plug-in for the presentation program. The presentation program instructions 112 and the labeling program instructions 114 are thus interoperable insofar as the labeling program instructions 114 can place the labels of a scatter chart displayed by the presentation program.

Further, the microprocessor 110 serves for execution of graphical user interface (GUI) program instructions 116 that generate a GUI, such as the Microsoft Windows or Apple MacOS user interface.

The computer system 100 is coupled to a computer monitor 118, a keyboard 120 and computer mouse 122. The labeled scatter chart is displayed on the monitor 118. By means of the computer mouse 122 and/or the keyboard 120 a user can enter modifications of the labels, such as by editing the labels, via the GUI.

In operation the scatter chart is displayed by means of the presentation program instructions 112. The labeling program instructions 114 are invoked in order to label the scatter chart using the label content data 104 and the label format data 106. The resultant labeled scatter chart is displayed on the monitor 118.

When a user enters a modification of one of the labels displayed as part of the labeled scatter chart this automatically invokes execution of the labeling program instructions 114 in order to update the labeled scatter chart in view of the modified label content and/or label format entered by the user.

This is particularly advantageous as entering an modification does not require opening a data sheet or spreadsheet. Rather the modification can be entered directly by editing the displayed label and the updated labeled scatter chart is generated and displayed automatically without requiring further user interaction.

Figure 2:
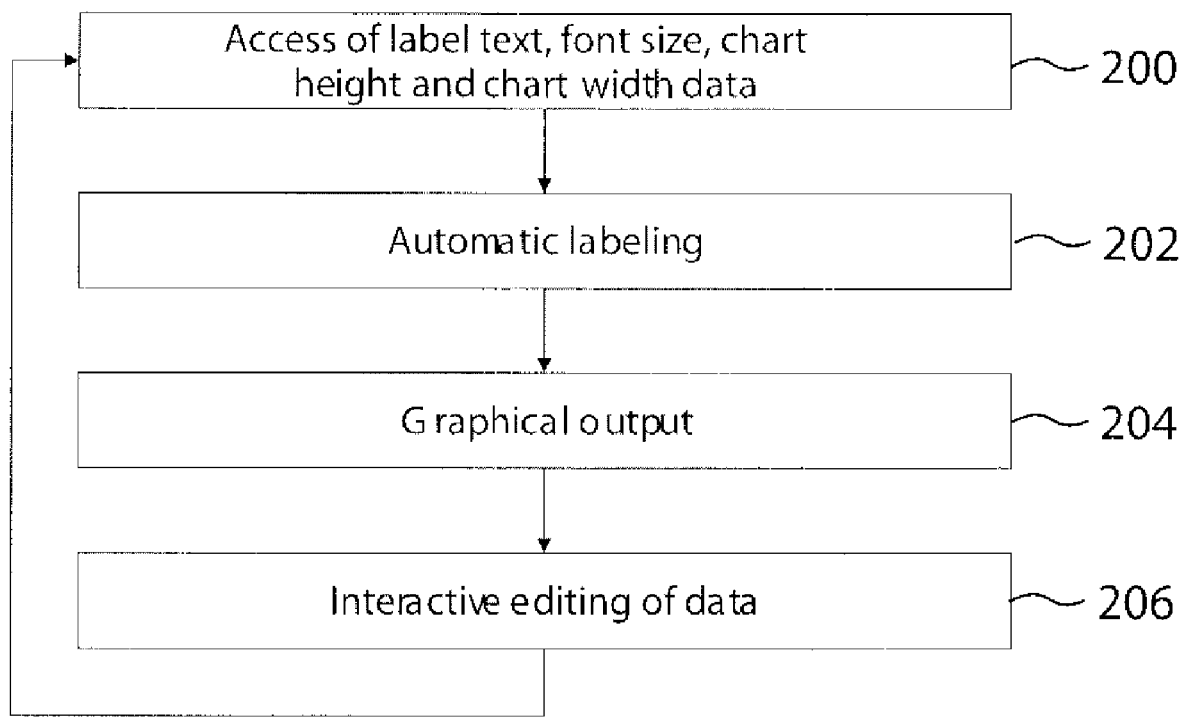
FIG. 2 is a flowchart illustrating an embodiment of a method of the invention.

FIG. 2 shows a flowchart illustrating a method of the invention. In step 200 label content data, label format data and/or chart geometry data are accessed, such as data specifying label text and font size. In step 202 a scatter chart to which the specified labels relate is labeled automatically and the resultant labeled scatter chart is output graphically in step 204. In step 206 a user interactively edits the data that specifies the labels. In response the control goes back to step 200 in order to restart the automatic labeling based on the modified label specification.

Figure 3:
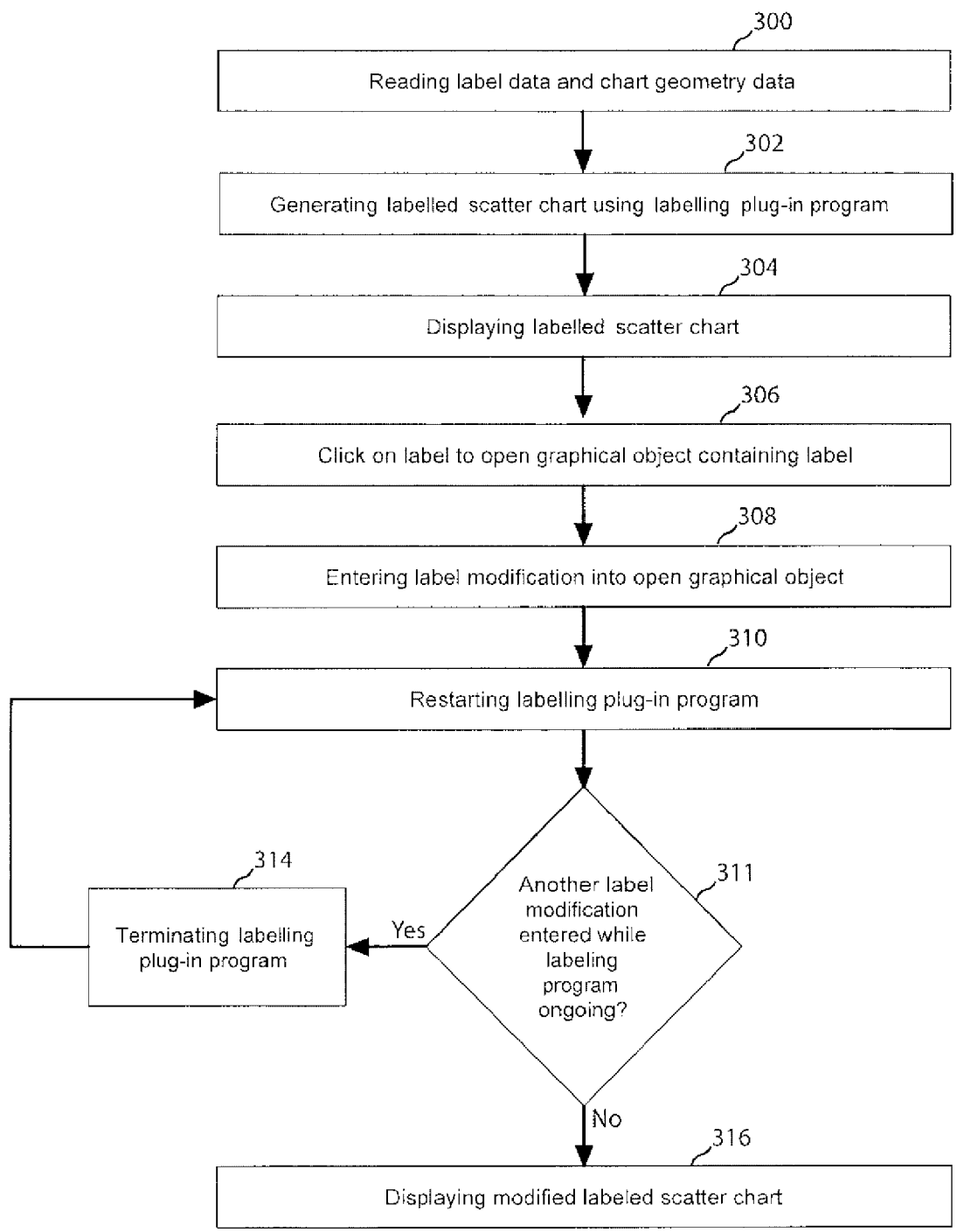
FIG. 3 is a flowchart illustrating a more detailed embodiment of a method of the invention.

FIG. 3 shows a more detailed embodiment of a method of the invention. In step 300 label data, such as label content and label format data, as well as chart geometry data is read from memory. A labeled scatter chart is generated in step 302 by means of a plug-in program (cf. program instructions 114 of FIG. 1) that is used to perform the labeling operation on the basis of the data read in step 300.

In step 304 the labeled scatter chart is displayed on a graphical user interface. In step 306 the user initiates an editing operation in order to input a label modification. For this purpose the user clicks on the label to be edited with the computer mouse (cf. computer mouse 122 of FIG. 1) in order to open the graphical object that contains the label.

For example, each label of the labeled scatter chart is contained in a separate graphical object, such as a text field. When the user clicks on the text field, the text field opens and a cursor is shown in the text field for editing the label shown in the text field.

The label modification is entered by the user into the open graphical object in step 308. This can be done by means of the computer mouse 122 and/or the keyboard 120 (cf. FIG. 1). For example, if the user depresses one of the keys of the keyboard 120 in order to add a character to the label, to replace a character by another character, delete a character and/or change the label format, this automatically restarts the labeling plug-in program (step 310).

Independently form the ongoing execution of the labeling plug-in program the user can enter a subsequent label modification, such as by another keystroke on the keyboard 120. In step 311 it is determined whether such a subsequent label modification was entered before the execution of the labeling plug-in program that was started in step 310 finished.

If the labeling plug-in finished to any subsequent label modification, the control goes to step 316 in order to display the update of the labeled scatter chart on the basis of the entered label modifications. If the contrary is the case the control goes from step 311 to step 314 in order to terminate execution of the labeling plug-in program as further processing of the labeling algorithm by the plug-in program is of no interest anymore due to the subsequently entered label modification.

From step 314 the control goes to step 310 in order to restart the labeling plug-in program on the basis of the up-to-date label modifications as entered in step 308 and/or during execution of steps 310 and/or 311.

It is to be noted that execution of the steps 310, 311, 314 and 316 is initiated with each subsequent entry of a label modification. After all modifications have been entered into the label whose graphical object has been opened in step 306, the user can perform another mouse click in order to close that graphical object and/or in order to open anther graphical object containing another label for entering label modifications for that other label.

Figure 4:
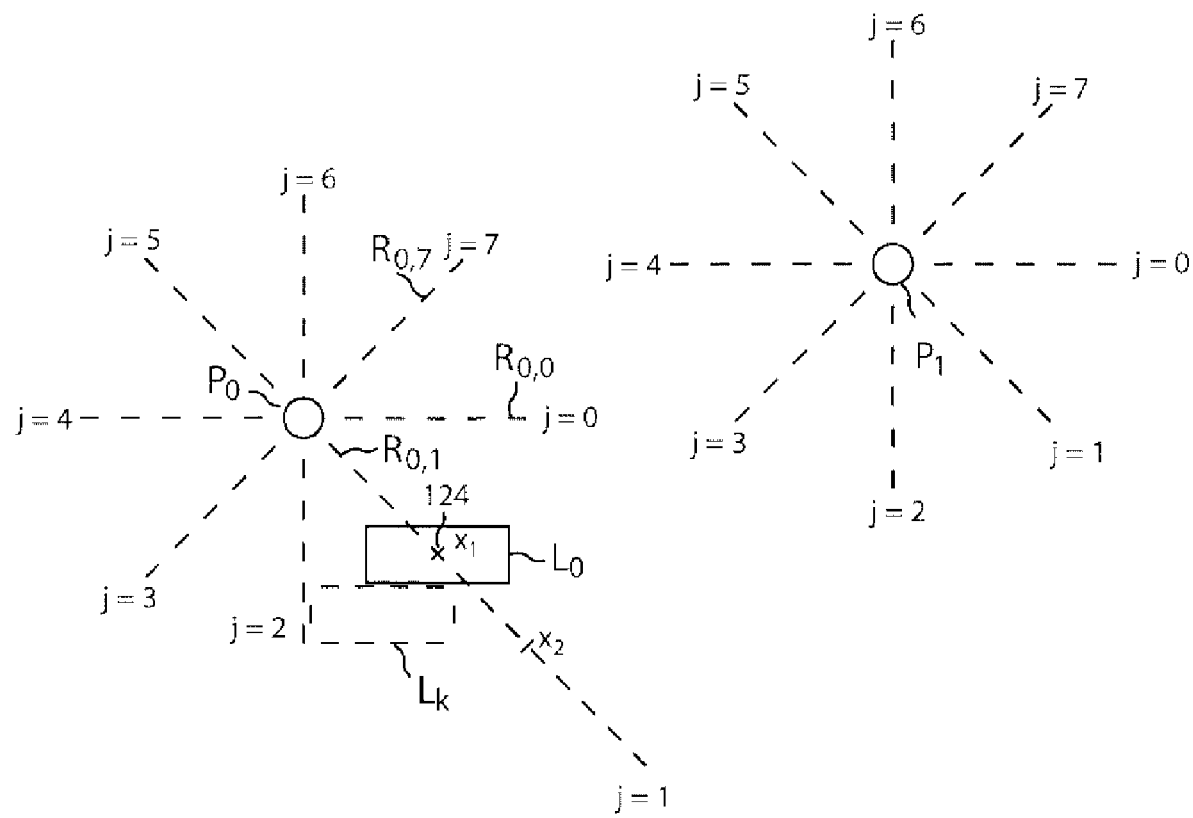
FIG. 4 illustrates the definition of a set of rays for each of the data points to be labeled and the determination of intervals that are allowed for labeling on each of the rays.

FIG. 4 schematically shows the definition of a set of rays for each data point of a scatter chart. FIG. 4 shows the data points $P_0$ and $P_1$ of the scatter chart. A set of N=8 rays $R_{i,j}$ is defined for each of the data points. These rays are illustrated as dashed lines in FIG. 4.

Each of the rays $R_{i,j}$ originates from its assigned data point $P_i$. For example a ray $R_{0,0}$ originates from the data point $P_i$ where i=0. Likewise the rays $R_{0,1}$, $R_{0,2}$, $R_{0,3}$, $R_{0,4}$, $R_{0,5}$, $R_{0,6}$ and $R_{0,7}$ originate for the data point $P_0$. The same applies analogously to the other data point $P_1$.

A label $L_i$ is assigned to each of the data points $P_i$. By way of example only, FIG. 4 shows the label $L_0$ that is assigned to the data point $P_0$. Each of the labels $L_i$ needs to be placed as close as possible to its assigned data point $P_i$ as this results in a labeling of the scatter chart that is most intuitively comprehensible by a user. If a label cannot be placed in close proximity to its assigned data point the label and the data point have to be connected by a connector line. Preferably, the labeling of the scatter charts is constrained by minimizing the number of connector lines and the length of the connector lines, if any.

Each set of rays $R_{i,j}$ defines the allowed labeling positions for placement of the label $L_i$. The label $L_i$ cannot be placed on arbitrary positions on the scatter chart but only on one ray of the set of rays $R_{i,j}$. In the exemplary embodiment considered with respect to FIG. 4 the centers of the labels need to be positioned on one of the respective rays for placement of a label. For example, the center 124 of the label $L_0$ needs to be placed on one of the rays $R_{0,0}$ to $R_{0,7}$ for placement of the label $L_0$.

A table $T_i$ is determined for each data point $P_i$. The table $T_i$ stores one or more intervals for each ray of the set of rays that originate fro the point $P_i$ on which the label $L_i$ can be placed. The intervals define where on a certain ray the label $L_i$ may be placed. In general, the label $L_i$ can be placed on any position along a given ray from distance 0 to a point at infinity. However, some or all positions on a ray may be obstructed by obstacles like other labels, other data points or connector lines. This situation occurs with respect to the label $L_k$ that is located close to the data point $P_0$. The rectangle that represents that label $L_k$ which belongs to data point $P_k$ (not shown) must not be intersected by $L_0$. Hence on ray $R_{0,1}$ the label $L_0$ can only be placed between 0 and $x_1$ or between position $x_2$ and infinity. If $L_0$ were placed on ray $R_{0,1}$ on any position between $x_1$ and $x_2$ it would necessarily intersect label $L_k$. Likewise, positions on a certain ray may be obstructed by another data point or by a connecting line. In all these cases the interval of intersecting positions on the ray is excluded from the allowed labeling intervals stored in table $T_i$.

Figure 5:
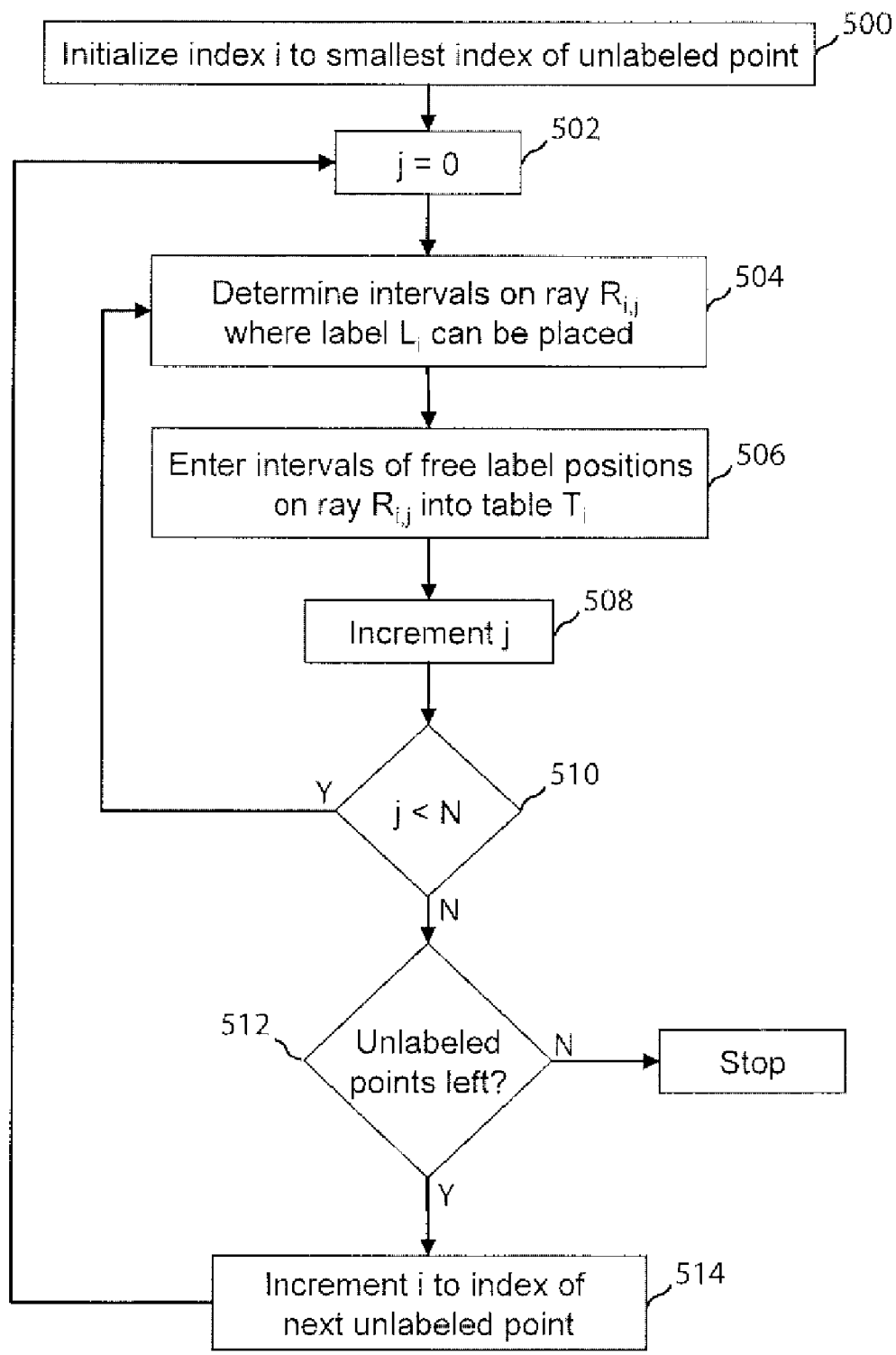
FIG. 5 is a flowchart illustrating a method for determination of the intervals.

FIG. 5 shows a respective flowchart for generating the tables $T_i$. In step 500 the index i is initialized to the index of the first unlabeled data point.

In step 502 the index j is initialized to 0.

In step 504 one or more intervals of the ray $R_{i,j}$ are determined where the label $L_i$ can be placed excluding those portions of the ray $R_{i,j}$ that are blocked by other data points $P_k$, where k≠i, or that are blocked by labels $L_k$ that have already been placed.

In step 506 the one or more intervals that have been determined in step 504 are entered into the table $T_i$ for the ray $R_{i,j}$. In step 508 j is incremented in order to go to the next ray of the set of rays that is assigned to the data point $P_i$. In step 510 a decision is made whether the index j is less than N, the number or rays per data point. If this condition is true, the algorithm continues with step 504. After all rays of the set of rays originating from the data point $P_i$ have been processed the table $T_i$ from that data point $P_i$ is complete and because j=N control goes from step 510 to step 512. In step 512 a decision is made whether another unlabeled data point $P_k$ exists whose table $T_k$ has not yet been computed. If this condition is true, control goes to step 514 where the index i is incremented to the index of the next unlabeled data point. Then control goes back to step 502. This procedure is carried out until all unlabeled data points have been processed, i.e., the table $T_i$ for each unlabeled data point has been computed and the condition in step 512 evaluated to false.

Figure 6:
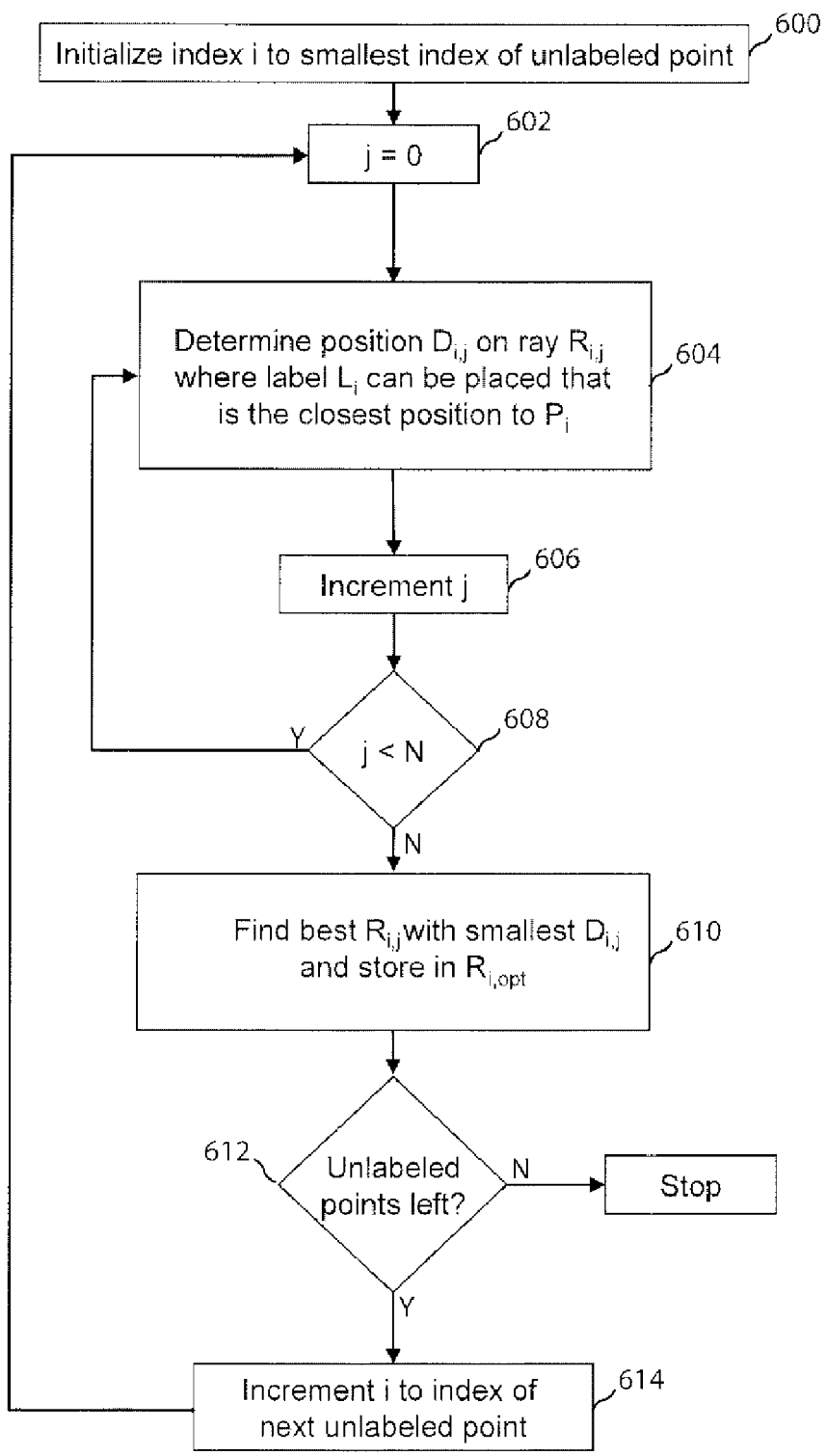
FIG. 6 is a flowchart illustrating a method for determining a labeling position on at least one ray of each set of rays.

FIG. 6 shows a flowchart illustrating a method of selecting at least one ray of each unlabeled data point as a candidate ray for placing the next label. In step 600 the index i is initialized to the index of the first unlabeled data point. In step 602 the index j is initialized to 0. In step 604 the intervals associated with ray $R_{i,j}$ are read from table $T_i$. Among those intervals of free label positions, the free label position closest to the data point $P_i$ itself is searched and this value is stored in variable $D_{i,j}$. In step 606 j is incremented and the control goes to step 608 where a decision is made whether j<N, the number of rays per data point. If this condition holds control goes back to step 604 for determining the position $D_{i,j}$ on the next ray $R_{i,j}$ of the data point $P_i$.

After all rays $R_{i,j}$ of the data point $P_i$ have been processed and when consequently j=N, the control goes from step 608 to step 610. In step 610 the best ray $R_{i,opt}$ belonging to point $P_i$ is chosen. The selection criterion is the best label position $D_{i,j}$ that has been determined for each ray $R_{i,j}$ in step 604. The ray $R_{i,j}$ that has the smallest value $D_{i,j}$, i.e., the free label position closest to the data point $P_i$, is defined as the best ray $R_{i,opt}$. This ray is considered to be the optimal ray as it allows labeling of the label $L_i$ closest to its assigned data point $P_i$. There can be more than one optimal ray per data point if there are multiple rays within the set of rays that have similar positions $D_{i,j}$.

In step 612 a decision is made whether more unlabeled data points exist. If this conditions holds, index i is incremented in step 614 to the index of the next unlabeled data point for processing of the set of rays of the next data point $P_i$ that has not been labeled yet.

Figure 7:
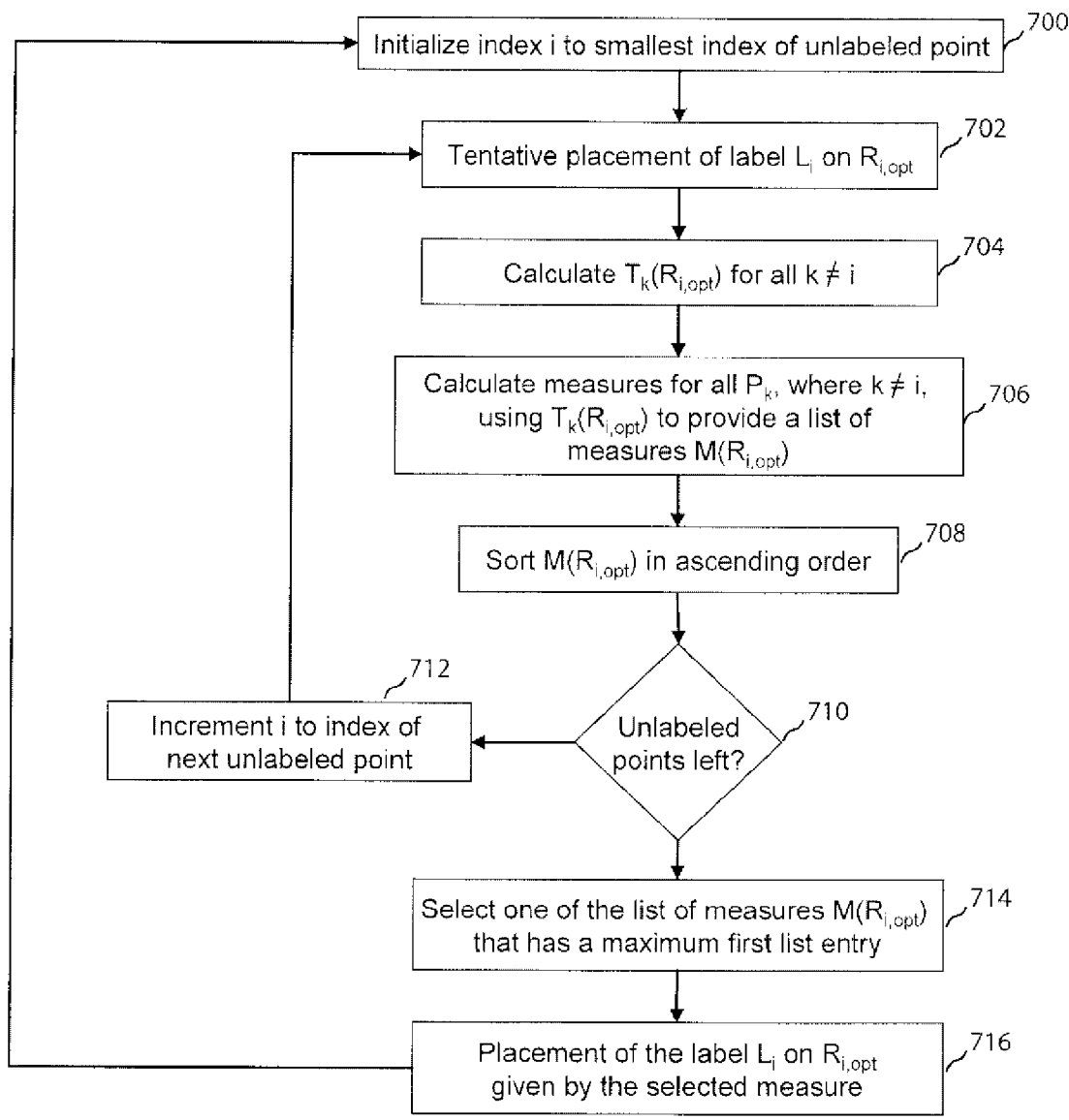
FIG. 7 is a flowchart illustrating a method of labeling on the basis of the positions that have been determined by means of the method of FIG. 6.

FIG. 7 shows a flowchart illustrating a method for labeling the scatter chart using the optimal rays $R_{i,opt}$ that have been determined in accordance with FIG. 6.

In step 700 the index i is initialized to the index of the first unlabeled data point. In step 702 the label $L_i$ is tentatively placed on the ray $R_{i,opt}$ at position $D_{i,j}$. In step 704 the table $T_k$ are updated for all unlabeled data points $P_k$ with k≠i taking into account the tentative placement of the label $L_i$. The tentatively placed label $L_i$ may block label positions on one or more rays that originate from other data points $P_k$, k≠i. Hence, the table $T_k$ are updated in view of the tentative placement of the label $L_i$ for all values of k that are unequal to i and that correspond to data points $P_k$ that have not been labeled yet. The method of FIG. 5 is performed again for updating the tables $T_k$.

In step 706 a measure is calculated for each unlabeled data point $P_k$, where k≠i, using the updated tables $T_k$ in order to provide a list of measures reflecting the impact of the tentative placement of the label $L_i$. For example, each measure is calculated on the basis of a mathematical function that is monotonically decreasing from the data point to the point of infinity. An exponentially decreasing function is a convenient choice.

For calculation of the measure for a given data point $P_k$ the function is integrated over the allowable intervals of each ray $R_{k,j}$ of the set of rays that originate from that data point $P_k$. The allowed intervals are obtained from the table $T_k$ that has been calculated in step 704. The values that are obtained by integrating the function over the allowable intervals of each ray of the set of rays originating from the data point $P_k$ are summed up which provides the measure or the data point $P_k$. This is performed with respect to all unlabeled data points $P_k$ resulting in a list of measures M.

In setup 708 the list of measures M is sorted in ascending order. In step 710 a decision is made whether another unlabeled data point exists. If this condition holds the index i is incremented to the index of the next unlabeled point $P^i$ for tentative placement of another label $L_i$ which results in an additional sorted list of measures. This procedure is carried out until all unplaced labels $L_i$ have been tentatively placed and respective list of measures have been obtained. Then, because the condition defined in step 710 returns false, control goes to step 712.

In case a data point $P_i$ has more than one optimal ray the procedure is carried out a respective number of times for that data point which results in multiple list of measures for that data point.

In step 712 one of the list of measures M is selected. The selection criterion is the first list entry of the list of measure, whereby the list that has the largest first list entry is selected. If there is more than one list having the same largest first list entry, the second list entries are considered of those lists sharing the same maximum first list entry. In this instance the list of measures is selected that has a maximum second list entry.

Selection of one of the lists of measures implies selection of the ray $R_{i,opt}$ for which that list of measures has been calculated. In step 714 the label $L_i$ is placed on the ray $R_{i,opt}$ such that the data point $P_i$ becomes a labeled data point. From step 714 the control goes back to step 700 if unlabeled data points remain to be labeled.

Figure 8:
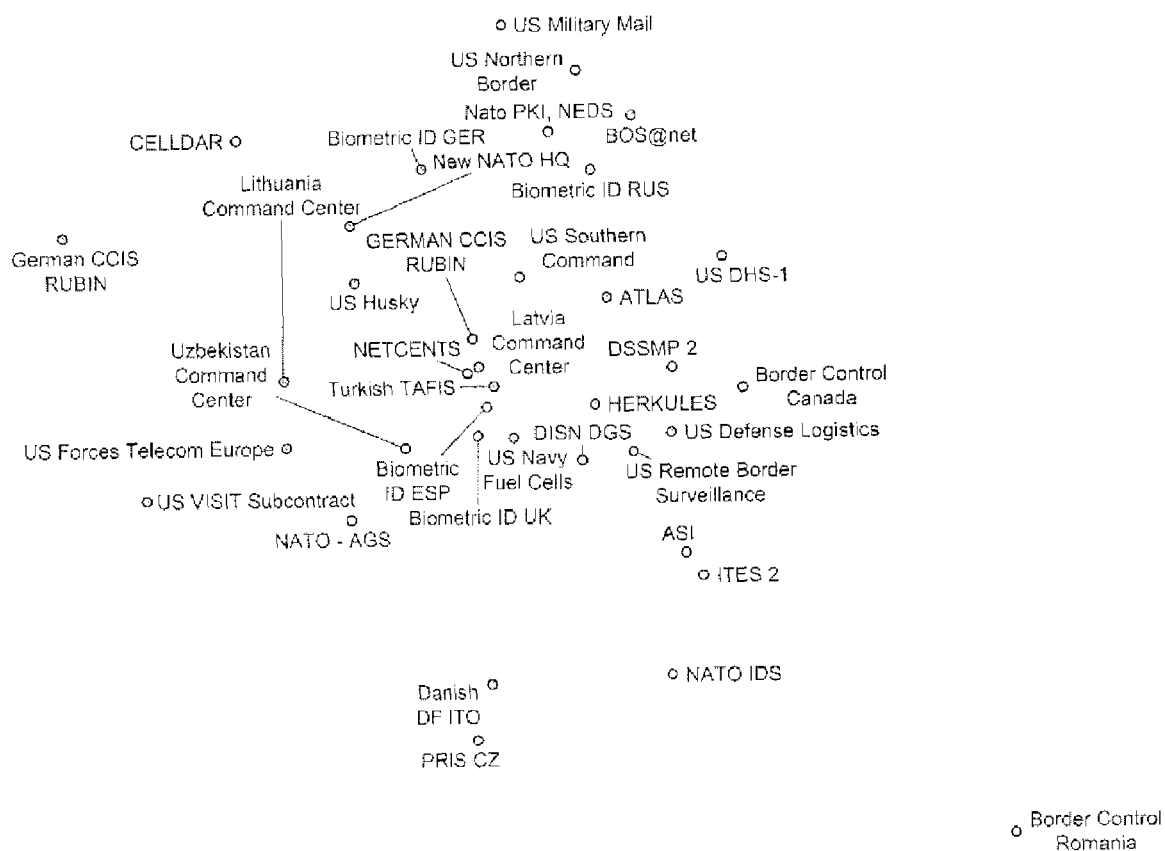
FIG. 8 shows an example of a scatter chart that has been labeled using a number N=16 rays per data point.

FIG. 8 shows a scatter chart that has been labeled in accordance with an embodiment of a method of the invention using a number of N=16 rays per data point.

Figure 9:
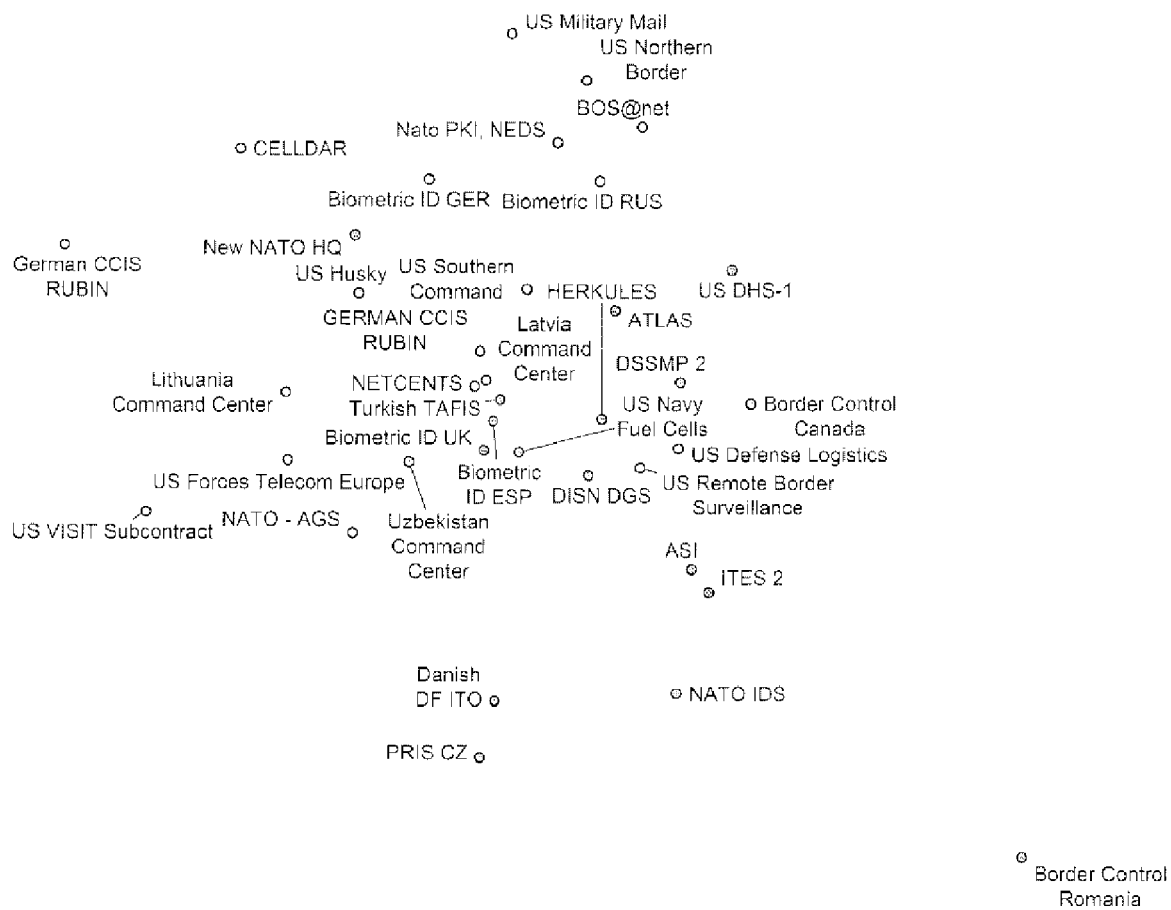
FIG. 9 shows the scatter chart of FIG. 8 whereby a number N=128 of rays have been used per data point.

FIG. 9 shows the scatter chart of FIG. 8 using the same labeling method but with a number N=128 of rays per set of rays.

| List of Reference Numerals | |
|---|---|
| 100 | Computer system |
| 102 | Memory |
| 104 | Label content data |
| 106 | Label format data |
| 108 | Chart geometry data |
| 110 | Microprocessor |
| 112 | Presentation program instructions |
| 114 | Labeling program instructions |
| 116 | Graphical user interface (GUI) program instructions |
| 118 | Monitor |
| 120 | Keyboard |
| 122 | Computer mouse |

What is claimed is:

1. A method of automatic labeling an unlabeled scatter chart including geometrically distributed data points, comprising the steps of:
   1. retrieving from a memory data that specifies an unlabeled scatter chart including label content data, label format data and chart geometry data, and labels to be associated with data points;

2. determining for each label positions juxtaposed to its associated data point on said scatter chart in a non-colliding manner according to a labeling algorithm in which the following steps are taken:
  (a) defining a set of N rays for each data point that originate from said data point with adjacent rays of said set enclosing an angle of $2\pi/N$, and wherein N is selected from a number from $2^3$ to $2^8$;
  (b) determining for each data point the allowed non-colliding locations on said set of N rays that a label can be placed on without colliding with another already placed label or data point;
  (c) determining a measure for each data point indicative of allowed non-colliding spaces remaining for labeling of data points by a monotonically decreasing function of distance of a non-colliding label position on a ray from an associated data point;
  (d) iteratively calculating tentative positions for non-colliding labels on said scatter chart on sets of N rays with respect to associated data points in accordance with the determinations of steps (b) and (c) to achieve the closest location for fixing non-colliding label positions relative to associated data points, and outputting the non-colliding labeled result for the data points; and
  (e) outputting graphically the resultant non-colliding labels for the data points.

2. The automatic labeling method of claim 1, wherein each of the non-colliding labels is contained in a graphical object.

3. The automatic labeling method of claim 2, further comprising opening one of the graphical objects via the graphical user interface and entering a first modification to the non-colliding label contained in the opened graphical object.

4. The automatic labeling method of claim 3, wherein the execution of the labeling algorithm is started while the graphical object is opened.

5. The automatic labeling method of claim 4, further comprising entering a second modification of the non-colliding label in the open graphical object, terminating the execution of the labeling algorithm if generation of the modified labeled scatter chart in response to the entry of the first modification has not been completed when the second modification is entered, and restarting the execution of the labeling algorithm for generating a second modified non-colliding labeled scatter chart in response to the entry of the second modification, wherein the second modified non-colliding labeled scatter chart is displayed on the graphical user interface instead of the first modified non-colliding labeled scatter chart.

6. The automatic labeling method of claim 5, wherein the execution of the labeling algorithm is restarted in response to entry of each subsequent modification of the one of the non-colliding labels for generating a respective modified non-colliding labeled scatter chart.

7. The automatic labeling method of claim 1, wherein the execution of the labeling algorithm is performed asynchronously, without preventing a user from interacting with a presentation system.

8. The automatic labeling method of claim 3, wherein the first modification is entered by a single user input action and the execution of the labeling algorithm is started automatically in response to the single user input action.

9. The automatic labeling method of claim 8, wherein the single user input action is a keystroke.

10. The automatic labeling method of claim 1, wherein step 2(d) further comprises tentatively placing a non-colliding label on one of the rays of the set of rays of its associated data point, calculating a measure for each other data point to provide a list of measures, wherein the list of measures is used to select or deselect the tentative placement of a non-colliding labeling position.

11. The automatic labeling method of claim 10, wherein the measure is in proportion to the remaining space for non-colliding labeling one of the other data points with the non-colliding label associated with that other data point.

12. The automatic labeling method of claim 10, wherein the following further steps are performed by execution of the labeling algorithm
  sorting each list of measures in ascending order;
  selecting a data point with the associated list of measures that has a maximum first list entry; and
  labeling in a non-colliding manner the selected data point.

13. The automatic labeling method of claim 3, wherein the first modification is entered without viewing a data sheet or a spreadsheet.

14. The method of automatic labeling according to claim 1 further comprising the steps of editing the resultant non-colliding labeled scatter chart by displaying the non-colliding labeled scatter chart on a graphical user interface with each non-colliding label displayed in an associated opened graphical object, entering a first modification of one of the non-colliding labels directly in the associated opened graphical object via the graphical user interface; automatically and immediately initiating execution of the labeling algorithm responsive to entry of the first modification for generating a first modified non-colliding labeled scatter chart; and
  displaying directly the first modified non-colliding labeled scatter chart on the graphical user interface.

15. The method of automatic labeling according to claim 14 further comprising the steps of
  entering a second modification of a non-colliding label directly in the associated open graphical object via the graphical user interface;
  immediately and automatically terminating execution of the labeling algorithm in process, and restarting the execution of the labeling algorithm for generating a second modified non-colliding labeled scatter chart in response to the entry of the second modification; and
  displaying the second modified non-colliding labeled scatter chart on the graphical user interface.

16. Apparatus for automatically labeling a scatter chart including distributed data points, comprising:
  1. means for retrieving from a memory data that specifies a scatter chart including label content data, label format data and chart geometry data, and labels to be associated with data points;
  2. means for determining a position for each label juxtaposed to its associated data point on said scatter chart for display on a graphical user interface in a non-colliding manner according to a labeling algorithm which comprises:
    (a) means for defining a set of N rays for each data point that originate from said data point with adjacent rays of said set enclosing an angle of $2\pi/N$, and wherein N is selected from a number from $2^3$ to $2^8$;
    (b) mean for determining for each data point the locations on said set of N rays that a label can be placed without colliding with another already placed label or data point;
    (c) means for determining a measure for each data point indicative of space remaining for non-colliding labeling of data points by a monotonically decreasing function of distance of a non-colliding label position on a ray from an associated data point;
    (d) means for iteratively calculating tentative positions for non-colliding labels on said scatter chart on sets of N rays with respect to associated data points in accordance with the determinations of (b) and (c) to achieve the closest location for fixing non-colliding label positions relative to associated data points; and (e) means for outputting graphically the non-colliding labeled result for the data points.

* * * * *